(12) United States Patent
Xu et al.

(10) Patent No.: US 11,308,048 B2
(45) Date of Patent: Apr. 19, 2022

(54) DATABASE MIGRATION METHOD, APPARATUS, DEVICE, AND COMPUTER-READABLE MEDIUM

(71) Applicant: BEIJING OCEANBASE TECHNOLOGY CO., LTD., Beijing (CN)

(72) Inventors: Hu Xu, Zhejiang (CN); Yuzhong Zhao, Zhejiang (CN); Min Yang, Zhejiang (CN)

(73) Assignee: BEIJING OCEANBASE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/243,391

(22) Filed: Apr. 28, 2021

(65) Prior Publication Data

US 2021/0248117 A1 Aug. 12, 2021

Related U.S. Application Data

(63) Continuation of application No. PCT/CN2020/075015, filed on Feb. 13, 2020.

(30) Foreign Application Priority Data

Mar. 26, 2019 (CN) .......................... 201910230137.9

(51) Int. Cl.
*G06F 16/21* (2019.01)
*G06F 16/27* (2019.01)

(52) U.S. Cl.
CPC ............ *G06F 16/214* (2019.01); *G06F 16/27* (2019.01)

(58) Field of Classification Search
CPC .............................. G06F 16/214; G06F 16/27
(Continued)

(56) References Cited

U.S. PATENT DOCUMENTS

2013/0159248 A1* 6/2013 Mueller .................. G06F 16/21
707/609
2013/0268509 A1* 10/2013 O'Neill .................. G06F 16/278
707/713
(Continued)

FOREIGN PATENT DOCUMENTS

CN 104881443 A 9/2015
CN 105138603 A 12/2015
(Continued)

*Primary Examiner* — Robert W Beausoliel, Jr.
*Assistant Examiner* — Arthur Ganger
(74) *Attorney, Agent, or Firm* — Seed IP Law Group LLP

(57) ABSTRACT

The present specification discloses a database migration method, including: copying metadata from a first server of a database, the metadata including identification information of synthetic data; receiving a service instruction sent by a client after the copying the metadata from the first server of the database; determining, based on the service instruction, whether the synthetic data needs to be retrieved from the first server of the database; and in response to it is determined that the synthetic data needs to be retrieved from the first server of the database, copying the synthetic data from the first server of the database based on the identification information of the synthetic data. According to the present disclosure, the service instruction sent by the client is received in advance, and the synthetic data is copied from the first server of the database based on the identification information of the synthetic data, thereby reducing time taken for database migration.

20 Claims, 3 Drawing Sheets

(58) Field of Classification Search
USPC .......................................................... 707/694
See application file for complete search history.

(56) References Cited

U.S. PATENT DOCUMENTS

| | | |
|---|---|---|
| 2015/0019487 A1 | 1/2015 | Buehne et al. |
| 2016/0188710 A1 | 6/2016 | Dulba Naik |
| 2016/0342633 A1 | 11/2016 | Senthilnathan et al. |
| 2018/0137186 A1 | 5/2018 | Brodt et al. |
| 2018/0285353 A1 | 10/2018 | Ramohalli Gopala Rao et al. |

FOREIGN PATENT DOCUMENTS

| | | |
|---|---|---|
| CN | 106294387 A | 1/2017 |
| CN | 106339388 A | 1/2017 |
| CN | 106649335 A | 5/2017 |
| CN | 108932282 A | 12/2018 |
| CN | 109063091 A | 12/2018 |
| CN | 110059075 A | 7/2019 |
| EP | 2610765 A1 | 7/2013 |
| JP | 2018060384 A | 4/2018 |

\* cited by examiner

DATABASE MIGRATION METHOD, APPARATUS, DEVICE, AND COMPUTER-READABLE MEDIUM

BACKGROUND

Technical Field

The present specification relates to the field of computer technologies, and in particular, to a database migration method, apparatus, device, and a computer-readable medium.

Description of the Related Art

Databases are data warehouses that organize, store and manage data based on data structures. There are many types of databases, ranging from the simplest tables that store various types of data to large database systems that can store massive data, all of which are widely used in various aspects. In the information-based society, full and effective management and utilization of all kinds of information resources is a prerequisite for scientific research and decision-making management.

Due to limited storage amounts of servers of databases, when an original server can no longer hold more data, it is necessary to migrate data from the original server to a server with larger memory.

BRIEF SUMMARY

Implementations of the present specification provide a database migration method, apparatus, device, and a computer-readable medium to solve a problem of time-consuming database migration.

Implementations of the present specification provide a database migration method. The method includes: copying metadata from a first server of a database, the metadata including identification information of synthetic data; receiving a service instruction sent by a client after the copying the metadata from the first server of the database; determining, based on the service instruction, whether the synthetic data needs to be retrieved from the first server of the database; and in response to it is determined that the synthetic data needs to be retrieved from the first server of the database, copying the synthetic data from the first server of the database based on the identification information of the synthetic data.

In some implementations, the service instruction retrieves incremental data, and the metadata further includes identification information of the incremental data; the method further includes: before the receiving the service instruction sent by the client, copying the incremental data from the first server of the database based on the identification information of the incremental data, and after the copying the incremental data from the first server of the database, receiving the service instruction sent by the client.

In some implementations, the method further includes: after the receiving the service instruction sent by the client, copying the synthetic data from the first server of the database based on the identification information of the synthetic data.

In some implementations, the method further includes: after the copying the synthetic data from the first server of the database, deleting the first server of the database after the synthetic data in the first server of the database is copied.

In some implementations, the method further includes: before the copying the metadata from the first server of the database, setting a synchronization position in a log of the first server of the database, copying the incremental data and the synthetic data from the first server of the database before the synchronization position, and copying incremental data and synthetic data from the log after the synchronization position.

In some implementations, the identification information of the incremental data includes an identifier of a table to which the incremental data belongs and an identifier of a partition to which the incremental data belongs.

In some implementations, the incremental data includes first incremental data and persistently stored second incremental data, and the first incremental data is converted into the second incremental data when a storage amount of the first incremental data reaches an upper limit.

In some implementations, the synthetic data is formed through the second incremental data being merged with previously stored synthetic data, macroblocks are generated each time the synthetic data is formed, and the synthetic data includes a plurality of macroblocks.

In some implementations, the identification information of the synthetic data includes an identifier of a table to which the macroblocks belong, an identifier of a partition to which the macroblocks belong, a number of times the macroblocks are merged, and serial numbers of the macroblocks in a same merging.

Implementations of the present specification provide a database migration apparatus. The apparatus includes: a copying unit, configured to copy metadata from a first server of a database, the metadata including identification information of synthetic data; a receiving unit, configured to receive a service instruction sent by a client after the copying the metadata from the first server of the database; and a determination unit, configured to determine, based on the service instruction, whether the synthetic data needs to be retrieved from the first server of the database, where the copying unit is further configured to: in response to it is determined that the synthetic data needs to be retrieved from the first server of the database, copy the synthetic data from the first server of the database based on the identification information of the synthetic data.

In some implementations, the service instruction retrieves incremental data, and the metadata further includes identification information of the incremental data; the copying unit is further configured to: copy the incremental data from the first server of the database based on the identification information of the incremental data, and after the copying the incremental data from the first server of the database, receive the service instruction sent by the client.

In some implementations, the copying unit is further configured to copy the synthetic data from the first server of the database based on the identification information of the synthetic data.

In some implementations, the apparatus further includes: a deleting unit, configured to delete the first server of the database after the synthetic data in the first server of the database is copied.

In some implementations, the apparatus further includes: a setting unit, configured to: set a synchronization position in a log of the first server of the database, copy the incremental data and the synthetic data from the first server of the database before the synchronization position, and copy incremental data and synthetic data from the log after the synchronization position.

In some implementations, the identification information of the incremental data includes an identifier of a table to which the incremental data belongs and an identifier of a partition to which the incremental data belongs.

In some implementations, the incremental data includes first incremental data and persistently stored second incremental data, and the first incremental data is converted into the second incremental data when a storage amount of the first incremental data reaches an upper limit.

In some implementations, the synthetic data is formed through the second incremental data being merged with previously stored synthetic data, macroblocks are generated each time the synthetic data is formed, and the synthetic data includes a plurality of macroblocks.

In some implementations, the identification information of the synthetic data includes an identifier of a table to which the macroblocks belong, an identifier of a partition to which the macroblocks belong, a number of times the macroblocks are merged, and serial numbers of the macroblocks in a same merging.

Implementations of the present specification provide a computer-readable medium, where the computer-readable medium stores computer-readable instructions, and the computer-readable instructions can be executed by a processor to implement the following steps: copying metadata from a first server of a database, the metadata including identification information of synthetic data; receiving a service instruction sent by a client after the copying the metadata from the first server of the database; determining, based on the service instruction, whether the synthetic data needs to be retrieved from the first server of the database; and in response to it is determined that the synthetic data needs to be retrieved from the first server of the database, copying the synthetic data from the first server of the database based on the identification information of the synthetic data.

Implementations of the present specification provide a database migration device. The device includes a memory configured to store computer program instructions and a processor configured to execute the program instructions, where the following units of the device are triggered when the computer program instructions are executed by the processor: a copying unit, configured to copy metadata from a first server of a database, the metadata including identification information of synthetic data; a receiving unit, configured to receive a service instruction sent by a client after the copying the metadata from the first server of the database; and a determination unit, configured to determine, based on the service instruction, whether the synthetic data needs to be retrieved from the first server of the database, where the copying unit is further configured to: in response to it is determined that the synthetic data needs to be retrieved from the first server of the database, copy the synthetic data from the first server of the database based on the identification information of the synthetic data.

At least one of the technical solutions of the implementations of the present specification can achieve the following beneficial effects:

According to the present specification, the service instruction sent by the client is received in advance, and the synthetic data is copied from the first server of the database based on the identification information of the synthetic data, thereby reducing time taken for database migration.

BRIEF DESCRIPTION OF THE DRAWINGS

To describe the technical solutions in the implementations of the present specification more clearly, the following briefly describes accompanying drawings required for describing the implementations. Clearly, the accompanying drawings in the following description show merely some implementations of the present specification, and a person of ordinary skill in the art can still derive other accompanying drawings from these accompanying drawings without making innovative efforts.

DETAILED DESCRIPTION

To make a person skilled in the art better understand the technical solutions in the present specification, the following clearly and fully describes the technical solutions in the implementations of the present specification with reference to the accompanying drawings in the implementations of the present specification. Clearly, the described implementations are merely some but not all of the implementations of the present application. All other implementations obtained by a person of ordinary skill in the art based on the implementations of the present specification without making innovative efforts shall fall within the protection scope of the present application.

Figure 1:
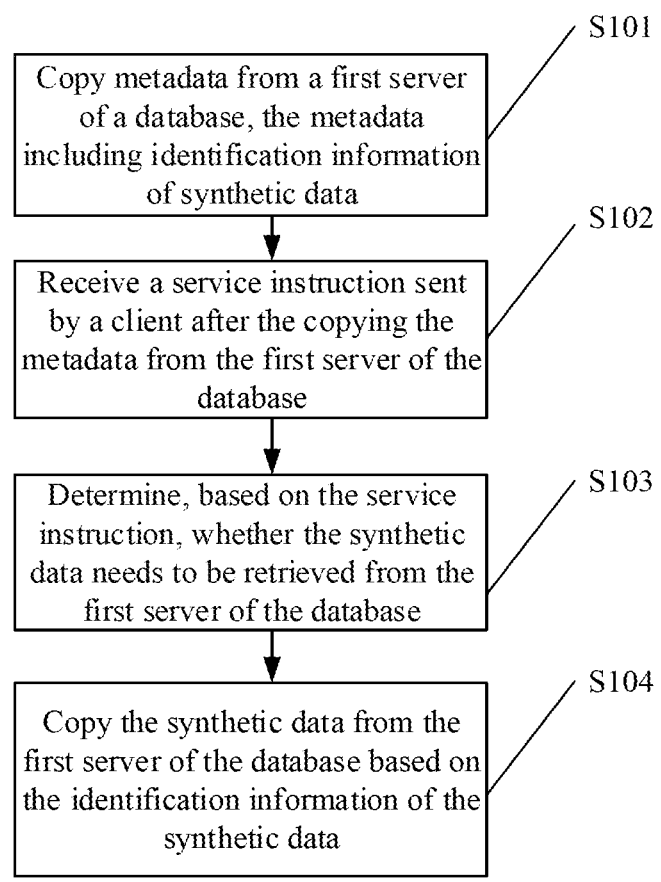
FIG. 1 is a schematic flowchart illustrating a database migration method according to implementation 1 of the present specification.

FIG. 1 is a schematic flowchart illustrating a database migration method according to some implementations of the present specification. The schematic flowchart includes:

Step S101: Copy metadata from a first server of a database, the metadata including identification information of synthetic data.

Step S102: Receive a service instruction sent by a client after the copying the metadata from the first server of the database.

Step S103: Determine, based on the service instruction, whether the synthetic data needs to be retrieved from the first server of the database; in response to the synthetic data needing to be retrieved from the first server of the database, perform step S104; in response to the synthetic data not needing to be retrieved from the first server of the database, it indicates that the data needing to be retrieved by the service instruction already exists and does not need to be invoked from the first server of the database.

Step S104: Copy the synthetic data from the first server of the database based on the identification information of the synthetic data.

In the present implementations, the above steps can be performed by a second server of the database with larger memory than the first server of the database.

Figure 2:
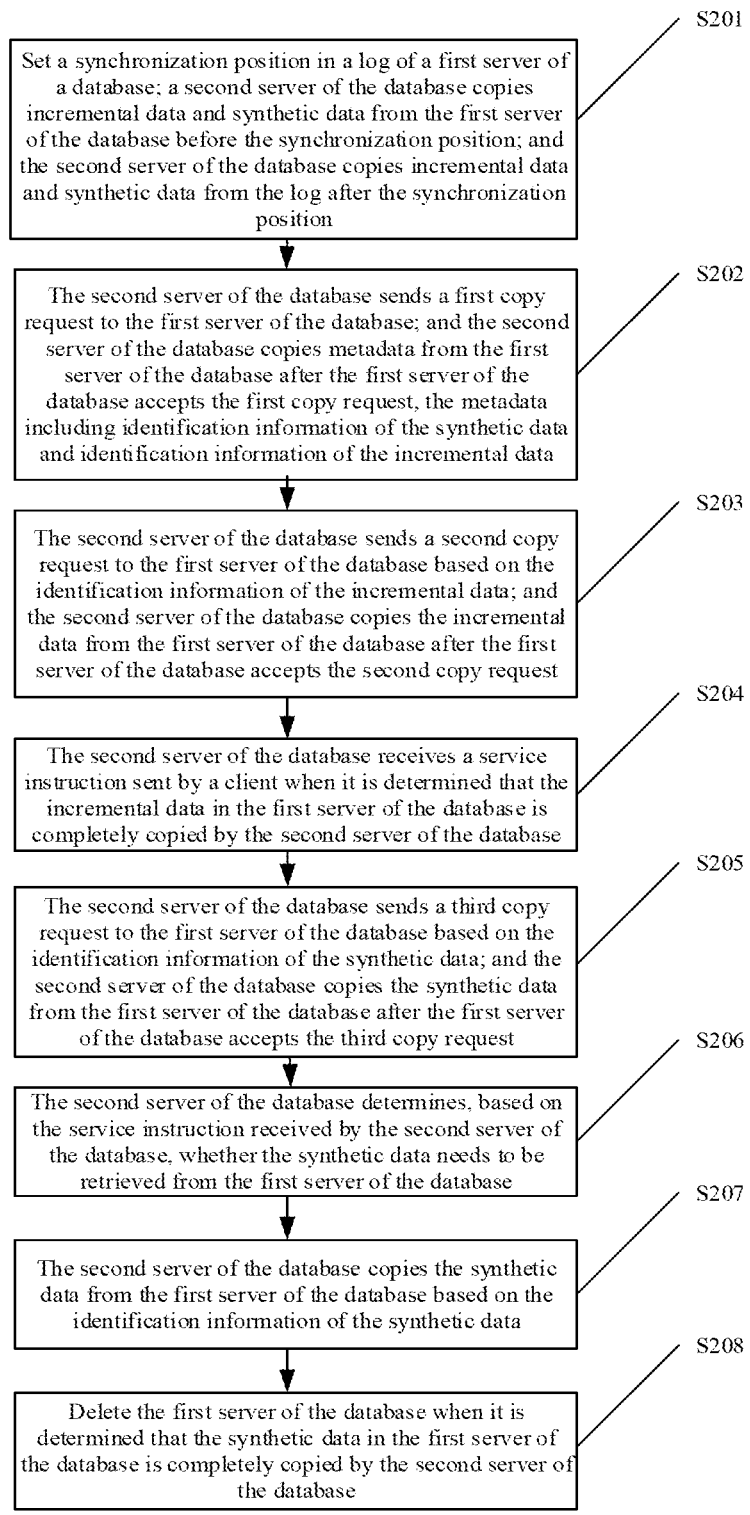
FIG. 2 is a schematic flowchart illustrating a database migration method according to implementation 2 of the present specification.

FIG. 2 is a schematic flowchart illustrating a database migration method according to some implementations of the present specification. The schematic flowchart includes:

Step S201: Set a synchronization position in a log of a first server of a database; a second server of the database copies incremental data and synthetic data from the first server of the database before the synchronization position; and the second server of the database copies incremental data and synthetic data from the log after the synchronization position. The following steps are intended for database migration before the synchronization position.

In step S201 of the implementations of the present specification, the present implementations aim to migrate data from the first server of the database to the second server of the database, and the data includes the incremental data and the synthetic data.

Step S202: The second server of the database sends a first copy request to the first server of the database; and the second server of the database copies metadata from the first server of the database after the first server of the database accepts the first copy request, the metadata including identification information of the synthetic data and identification information of the incremental data.

In step S202 of the implementations of the present specification, the first copy request is an authentication instruction sent by the second server of the database to the first server of the database, and the second server of the database copies the metadata from the first server of the database after the first server accepts the authentication instruction. The metadata is information describing data attributes.

Step S203: The second server of the database sends a second copy request to the first server of the database based on the identification information of the incremental data; and the second server of the database copies the incremental data from the first server of the database after the first server of the database accepts the second copy request.

In step S203 of the implementations of the present specification, the second copy request includes the identification information of the incremental data, and the identification information of the incremental data includes an identifier (ID) of a table to which the incremental data belongs and an identifier (ID) of a partition to which the incremental data belongs. After the first server of the database authenticates that the identification information of the incremental data is correct, the second server of the database logically copies the incremental data from the first server of the database.

In step S203 of the implementations of the present specification, the incremental data includes first incremental data and persistently stored second incremental data, and the first incremental data is converted into the second incremental data when a storage amount of the first incremental data reaches an upper limit.

Step S204: The second server of the database receives a service instruction sent by a client when it is determined that the incremental data in the first server of the database is completely copied by the second server of the database.

In step S204 of the implementations of the present specification, before this step, the service instruction of the client is sent to the first server of the database; after this step, the service instruction of the client is directly sent to the second server of the database, indicating that at this time, the second server of the database has a capability to process the data properly.

Step S205: The second server of the database sends a third copy request to the first server of the database based on the identification information of the synthetic data; and the second server of the database copies the synthetic data from the first server of the database after the first server of the database accepts the third copy request.

In step S205 of the implementations of the present specification, the third copy request includes the identification information of the incremental data. After the first server of the database authenticates that the identification information of the synthetic data is correct, the second server of the database logically copies the synthetic data from the first server of the database.

In step S205 of the implementations of the present specification, the synthetic data is formed through the second incremental data being merged with previously stored synthetic data, macroblocks are generated each time the synthetic data is formed, and the synthetic data includes a plurality of macroblocks. A condition for merging the second incremental data and the previously stored synthetic data is triggering based on a predetermined instruction or triggering based on predetermined time.

In step S205 of the implementations of the present specification, the identification information of the synthetic data includes an identifier of a table to which the macroblocks belong, an identifier of a partition to which the macroblocks belong, a number of times the macroblocks are merged, and serial numbers of the macroblocks in a same merging; and the number of times the macroblocks are merged refers to the times of merging of the synthetic data a certain macroblock is subject to, and the serial numbers of the macroblocks in a same merging refer to the respective positions each macroblocks are placed at for the same merging of the synthetic data.

Step S206: The second server of the database determines, based on the service instruction received by the second server of the database, whether the synthetic data needs to be retrieved from the first server of the database; in response to the synthetic data needing to be retrieved from the first server of the database, performing step S207; in response to the synthetic data not needing to be retrieved from the first server of the database, it indicates that the data needing to be retrieved by the service instruction already exists in the second server of the database and does not need to be invoked from the first server of the database.

In step S206 of the implementations of the present specification, in this step, the service instruction needs to retrieve the macroblocks in the synthetic data.

Step S207: The second server of the database copies the synthetic data from the first server of the database based on the identification information of the synthetic data.

In step S207 of the implementations of the present specification, this step occurs when the synthetic data is not completely copied by the second server of the database from the first server of the database, but the service instruction needs to use the synthetic data in the first server of the database. In such case, the synthetic data is copied from the first server of the database based on the identification information of the synthetic data, and the synthetic data is the macroblocks. Because the macroblocks occupy large memory and are difficult to retrieve, the macroblocks are subdivided into a plurality of small macroblocks during storage and are stored in a cache.

Step S208: Delete the first server of the database when it is determined that the synthetic data in the first server of the database is completely copied by the second server of the database.

The above solution can be applied to migration between two servers of a same database, or can be applied to migration between two servers of two different databases.

Figure 3:
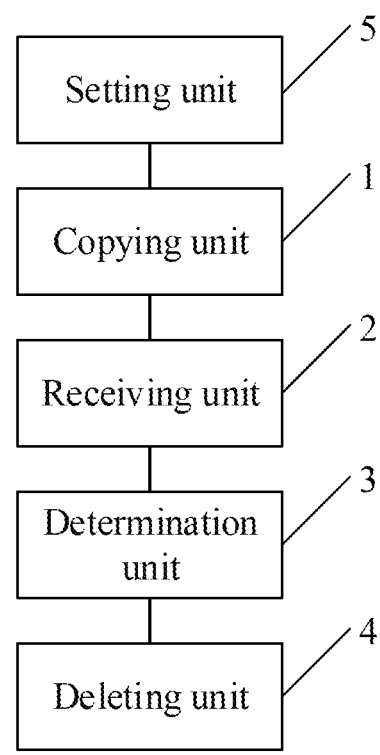
FIG. 3 is a schematic structural diagram illustrating a database migration apparatus according to implementation 3 of the present specification.

FIG. 3 is a schematic structural diagram illustrating a database migration apparatus according to some implementations of the present specification. The schematic structural diagram includes: a copying unit 1, a receiving unit 2, a determination unit 3, a deleting unit 4, and a setting unit 5.

The copying unit 1 is configured to copy metadata from a first server of a database.

The receiving unit 2 is configured to receive a service instruction sent by a client after the copying the metadata from the first server of the database.

The determination unit 3 is configured to determine, based on the service instruction, whether synthetic data needs to be retrieved from the first server of the database.

The copying unit 1 is further configured to: in response to determining that the synthetic data needs to be retrieved from the first server of the database, copy the synthetic data from the first server of the database based on identification information of the synthetic data.

The service instruction retrieves incremental data, and the metadata further includes identification information of the incremental data. The copying unit 1 is further configured to: copy the incremental data from the first server of the database based on the identification information of the incremental data, and after the copying the incremental data from the first server of the database, receive the service instruction sent by the client.

The copying unit 1 is further configured to copy the synthetic data from the first server of the database based on the identification information of the synthetic data.

The deleting unit 4 is configured to delete the first server of the database after the synthetic data in the first server of the database is copied.

The setting unit 5 is configured to: set a synchronization position in a log of the first server of the database, copy the incremental data and the synthetic data from the first server of the database before the synchronization position, and copy incremental data and synthetic data from the log after the synchronization position.

The identification information of the incremental data includes an identifier of a table to which the incremental data belongs and an identifier of a partition to which the incremental data belongs.

The incremental data includes first incremental data and persistently stored second incremental data, and the first incremental data is converted into the second incremental data when a storage amount of the first incremental data reaches an upper limit.

The synthetic data is formed through the second incremental data being merged with previously stored synthetic data, macroblocks are generated each time the synthetic data is formed, and the synthetic data includes a plurality of macroblocks.

The identification information of the synthetic data includes an identifier of a table to which the macroblocks belong, an identifier of a partition to which the macroblocks belong, a number of times the macroblocks are merged, and serial numbers of the macroblocks in a same merging.

Implementations of the present specification provide a computer-readable medium, where the computer-readable medium stores computer-readable instructions, and the computer-readable instructions can be executed by a processor to implement the following steps: copying metadata from a first server of a database, the metadata including identification information of synthetic data; receiving a service instruction sent by a client after the copying the metadata from the first server of the database; determining, based on the service instruction, whether the synthetic data needs to be retrieved from the first server of the database; and in response to determining that the synthetic data needs to be retrieved from the first server of the database, copying the synthetic data from the first server of the database based on the identification information of the synthetic data.

Implementations of the present specification provide a database migration device. The device includes a memory configured to store computer program instructions and a processor configured to execute the program instructions, where the following units of the device are triggered when the computer program instructions are executed by the processor: a copying unit, configured to copy metadata from a first server of a database, the metadata including identification information of synthetic data; a receiving unit, configured to receive a service instruction sent by a client after the copying the metadata from the first server of the database; and a determination unit, configured to determine, based on the service instruction, whether the synthetic data needs to be retrieved from the first server of the database, where the copying unit is further configured to: in response to determining that the synthetic data needs to be retrieved from the first server of the database, copy the synthetic data from the first server of the database based on the identification information of the synthetic data.

A person skilled in the art should understand that the implementations of the present disclosure can be provided as methods, systems, or computer program products. Therefore, the present disclosure can take a form of hardware only implementations, software only implementations, or implementations with a combination of software and hardware. Further, the present disclosure can take a form of a computer program product implemented on one or more computer-usable storage media (including but not limited to disk storage, CD-ROM, and optical storage) containing computer-usable program code.

The present disclosure is described with reference to the flowcharts and/or block diagrams of the method, the device (system), and the computer program product according to the implementations of the present disclosure. It should be understood that each process and/or each block in the flowcharts and/or the block diagrams and a combination of a process and/or a block in the flowcharts and/or block diagrams can be implemented by computer program instructions. These computer program instructions can be provided for a computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that is in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer-readable medium does not include transitory media such as a modulated data signal and carrier.

It should also be noted that terms "include", "comprise" or any other variant thereof are intended to cover non-exclusive inclusion, so that processes, methods, products or devices that include a series of elements include not only those elements but also other elements that are not explicitly listed, or further include elements inherent to such processes, methods, products or devices. Without more constraints, an element preceded by "includes a . . . " does not preclude the existence of additional identical elements in the processes, methods, products or devices that include the element.

The above descriptions are merely implementations of the present specification and are not intended to limit the present specification. For a person skilled in the art, the present specification can be subject to various modifications and variations. Any modification, equivalent replacement, or improvement made without departing from the spirit and principle of the present specification shall fall within the scope of the claims.

The various embodiments described above can be combined to provide further embodiments. Aspects of the embodiments can be modified, if necessary, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A database migration method, comprising:
    copying metadata from a first server of a database to a second server of the database, the metadata including identification information of synthetic data;
    receiving, by the second server, a service instruction sent by a client after the copying the metadata from the first server of the database;
    determining, by the second server and based on the service instruction, whether the synthetic data needs to be retrieved from the first server of the database;
    in response to it is determined that the synthetic data needs to be retrieved from the first server of the database, requesting, by the second server, to copy the synthetic data of the database from the first server by sending the identification information of the synthetic data to the first server; and
    copying the synthetic data from the first server of the database to the second server based on the identification information of the synthetic data sent by the second server.

2. The database migration method according to claim 1, wherein the service instruction retrieves incremental data, and the metadata further includes identification information of the incremental data; and
    wherein the method further comprises:
        before the receiving the service instruction sent by the client, copying the incremental data from the first server of the database based on the identification information of the incremental data; and
        after the copying the incremental data from the first server of the database, receiving the service instruction sent by the client.

3. The database migration method according to claim 2, further comprising: after the receiving the service instruction sent by the client,
    copying the synthetic data from the first server of the database based on the identification information of the synthetic data.

4. The database migration method according to claim 3, further comprising: after the copying the synthetic data from the first server of the database,
    deleting the first server of the database.

5. The database migration method according to claim 4, further comprising:
    before the copying the metadata from the first server of the database;
        setting a synchronization position in a log of the first server of the database;
        copying the incremental data and the synthetic data from the first server of the database before the synchronization position; and
        copying incremental data and synthetic data from the log after the synchronization position.

6. The database migration method according to claim 2, wherein the identification information of the incremental data includes an identifier of a table to which the incremental data belongs and an identifier of a partition to which the incremental data belongs.

7. The database migration method according to claim 2, wherein the incremental data includes first incremental data and persistently stored second incremental data, and the first incremental data is converted into the second incremental data in response to a storage amount of the first incremental data reaches a threshold.

8. The database migration method according to claim 7, wherein the synthetic data is formed through the second incremental data being merged with previously stored synthetic data, macroblocks are generated each time the synthetic data is formed, and the synthetic data includes a plurality of macroblocks.

9. The database migration method according to claim 8, wherein the identification information of the synthetic data includes an identifier of a table to which the macroblocks belong, an identifier of a partition to which the macroblocks belong, a number of times the macroblocks are merged, and serial numbers of the macroblocks in a same merging.

10. A computer-readable medium, wherein the computer-readable medium stores computer-readable instructions, which when executed by a processor enable the processor to implement acts including:
    copying metadata from a first server of a database to a second server of the database, the metadata including identification information of synthetic data;
    receiving, by the second server, a service instruction sent by a client after the copying the metadata from the first server of the database;
    determining, by the second server and based on the service instruction, whether the synthetic data needs to be retrieved from the first server of the database;
    in response to it is determined that the synthetic data needs to be retrieved from the first server of the database, requesting, by the second server, to copy the synthetic data of the database from the first server by sending the identification information of the synthetic data to the first server; and
    copying the synthetic data from the first server of the database to the second server based on the identification information of the synthetic data sent by the second server.

11. A database migration device, comprising a memory storing executable instructions and a processor configured to execute the executable instructions, thereby implementing acts including:
    copying metadata from a first server of a database to a second server of the database, the metadata including identification information of synthetic data;
    receiving, by the second server, a service instruction sent by a client after the copying the metadata from the first server of the database;
    determining, by the second server and based on the service instruction, whether the synthetic data needs to be retrieved from the first server of the database;
    in response to it is determined that the synthetic data needs to be retrieved from the first server of the database, requesting, by the second server, to copy the synthetic data of the database from first server by sending the identification information of the synthetic data to the first server; and
    copying the synthetic data from the first server of the database to the second server based on the identification information of the synthetic data sent by the second server.

12. The device according to claim 11, wherein the service instruction retrieves incremental data, and the metadata further includes identification information of the incremental data; and
    wherein the acts include:
        before the receiving the service instruction sent by the client, copying the incremental data from the first server of the database based on the identification information of the incremental data; and
        after the copying the incremental data from the first server of the database, receiving the service instruction sent by the client.

13. The device according to claim 12, wherein the acts include:
    after the receiving the service instruction sent by the client, copying the synthetic data from the first server of the database based on the identification information of the synthetic data.

14. The device according to claim 13, wherein the acts include:
    after the copying the synthetic data from the first server of the database, deleting the first server of the database.

15. The device according to claim 14, wherein the act includes:
    before the copying the metadata from the first server of the database,
        setting a synchronization position in a log of the first server of the database,
        copying the incremental data and the synthetic data from the first server of the database before the synchronization position, and
        copying incremental data and synthetic data from the log after the synchronization position.

16. The device according to claim 12, wherein the identification information of the incremental data includes an identifier of a table to which the incremental data belongs and an identifier of a partition to which the incremental data belongs.

17. The device according to claim 12, wherein the incremental data includes first incremental data and persistently stored second incremental data, and the first incremental data is converted into the second incremental data in response to a storage amount of the first incremental data reaches a threshold.

18. The device according to claim 17, wherein the synthetic data is formed through the second incremental data being merged with previously stored synthetic data, macroblocks are generated each time the synthetic data is formed, and the synthetic data includes a plurality of macroblocks.

19. The device according to claim 18, wherein the identification information of the synthetic data includes an identifier of a table to which the macroblocks belong, an identifier of a partition to which the macroblocks belong, a number of times the macroblocks are merged, and serial numbers of the macroblocks in a same merging.

20. A data base system, comprising:
    a first server of a database; and
    a second server of the database, the second server configured to implement a database migration operation including actions of:
        copying metadata from the first server of the database to the second server of the database, the metadata including identification information of synthetic data;
        receiving a service instruction sent by a client after the copying the metadata from the first server of the database;
        determining, based on the service instruction, whether the synthetic data needs to be retrieved from the first server of the database;
        in response to determining that the synthetic data needs to be retrieved from the first server of the database, requesting to copy the synthetic data of the database from the first server by sending the identification information of the synthetic data to the first server; and
        copying the synthetic data from the first server of the database to the second server based on the identification information of the synthetic data.

\* \* \* \* \*